July 25, 1933.  M. J. PETERSEN  1,919,705
WEED OR QUACK GRASS PLOW
Filed Aug. 18, 1932   5 Sheets-Sheet 1
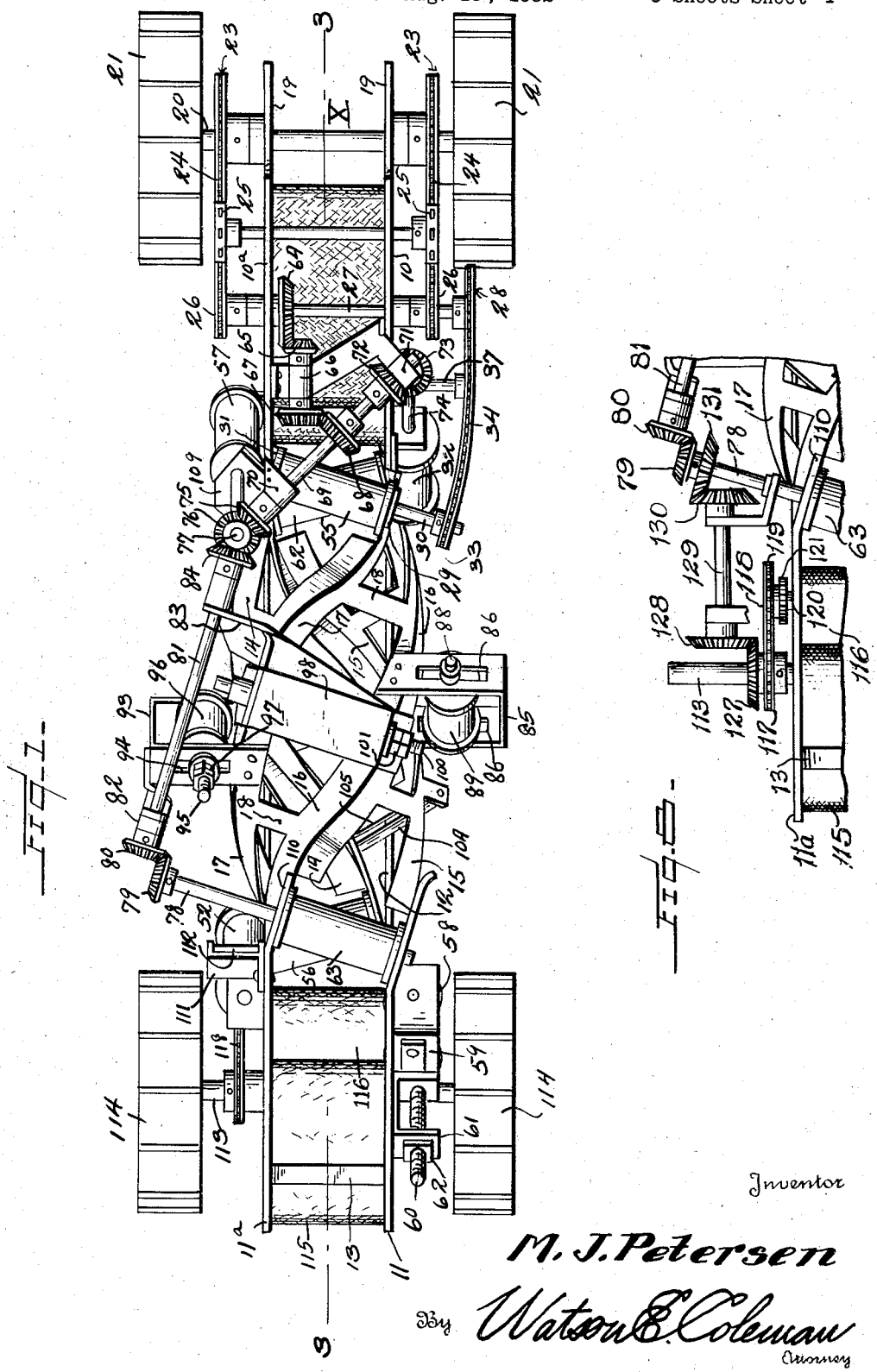
Inventor
M. J. Petersen
By Watson E. Coleman
Attorney

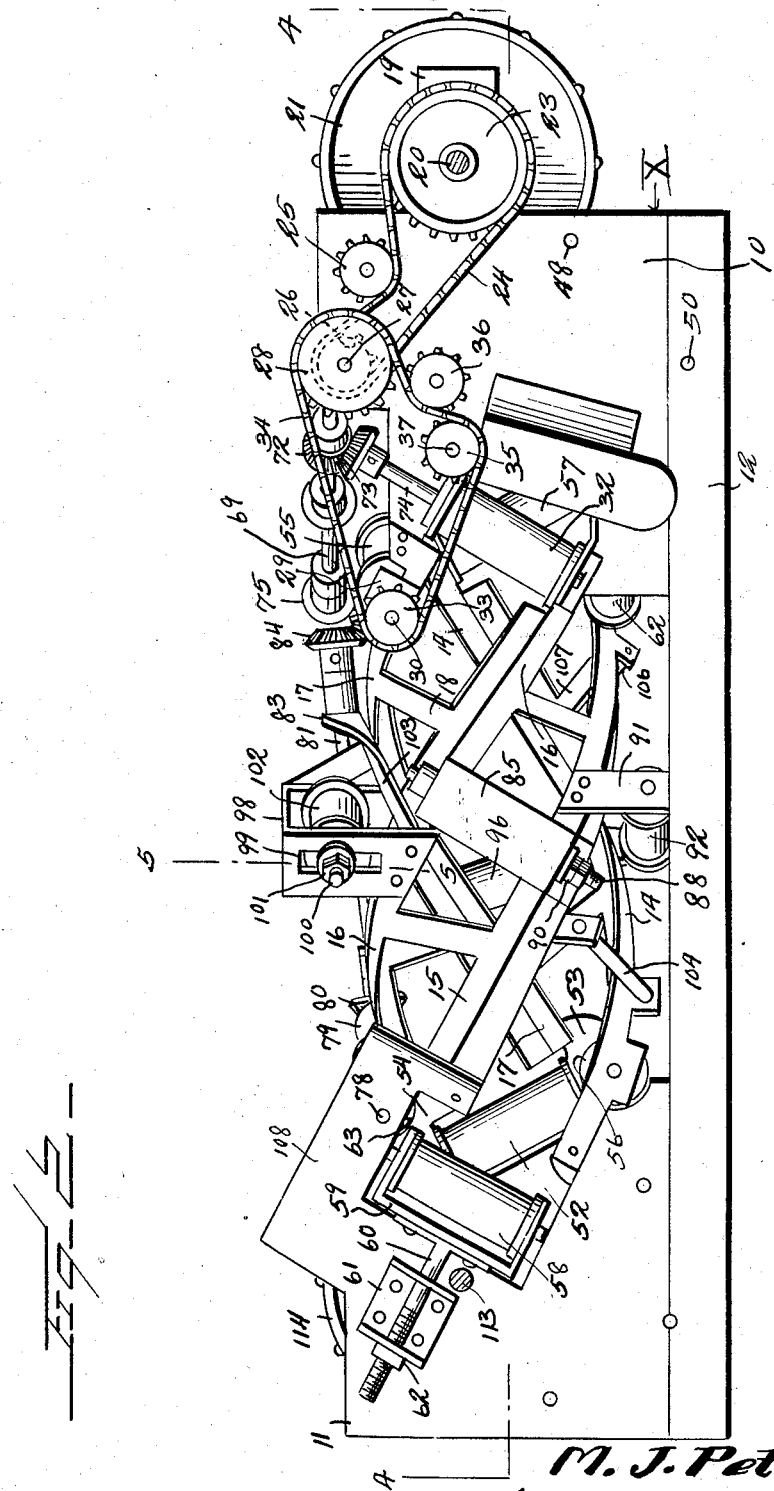

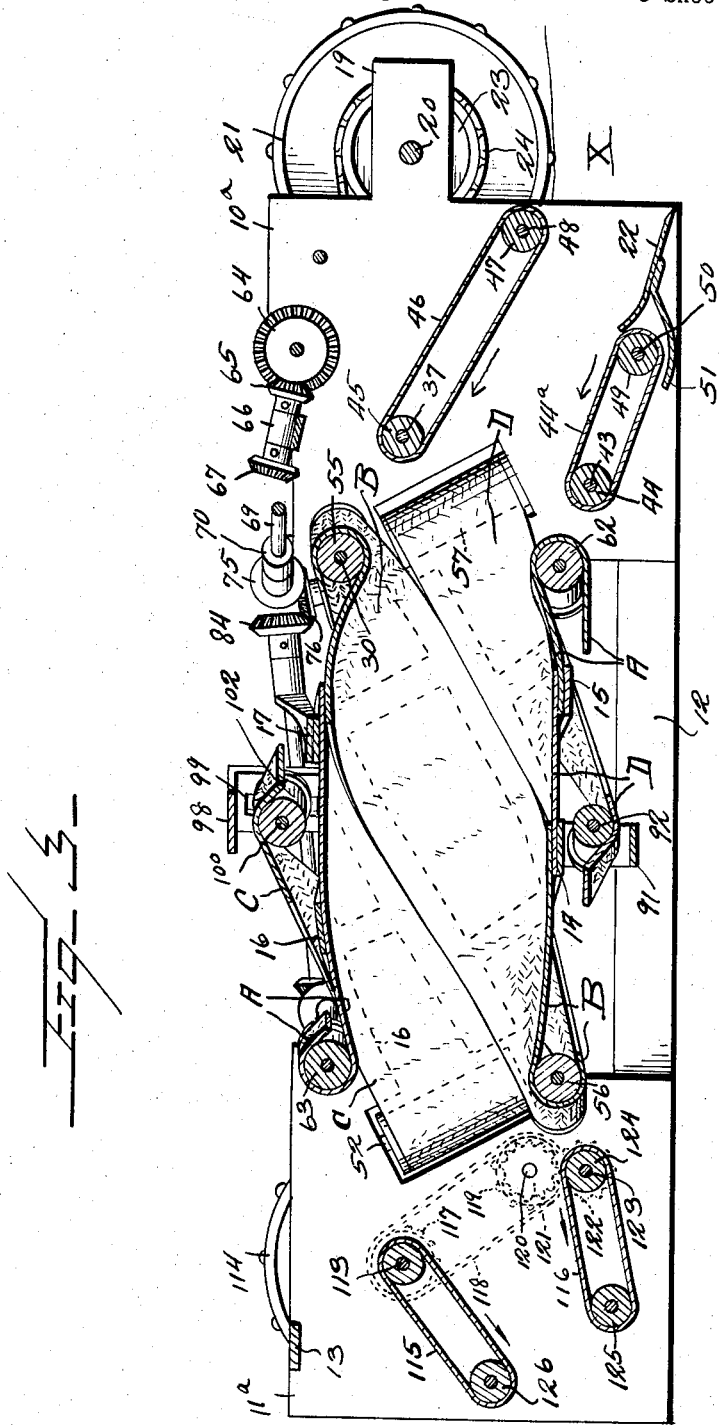

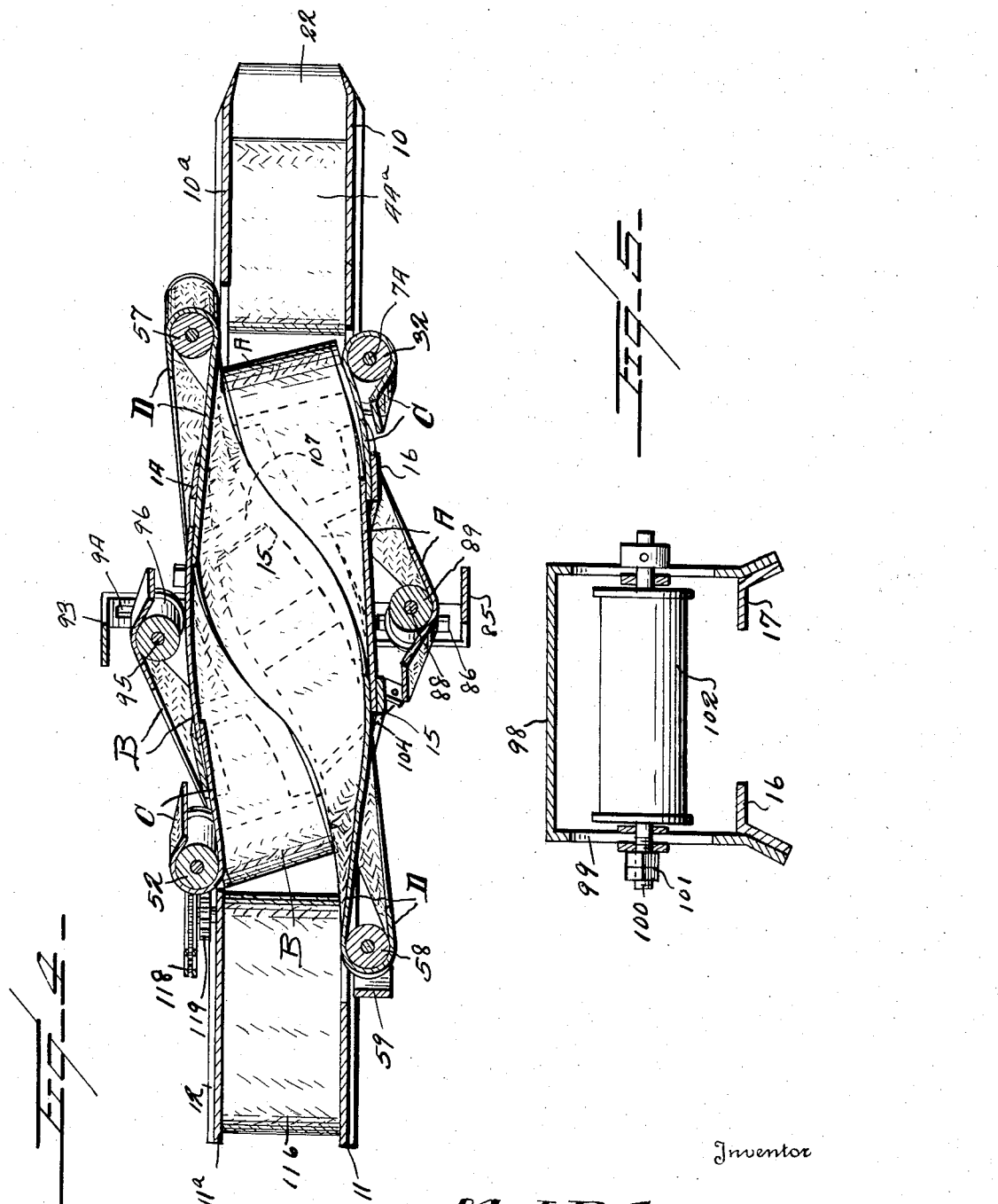

July 25, 1933.   M. J. PETERSEN   1,919,705
WEED OR QUACK GRASS PLOW
Filed Aug. 18, 1932   5 Sheets-Sheet 5
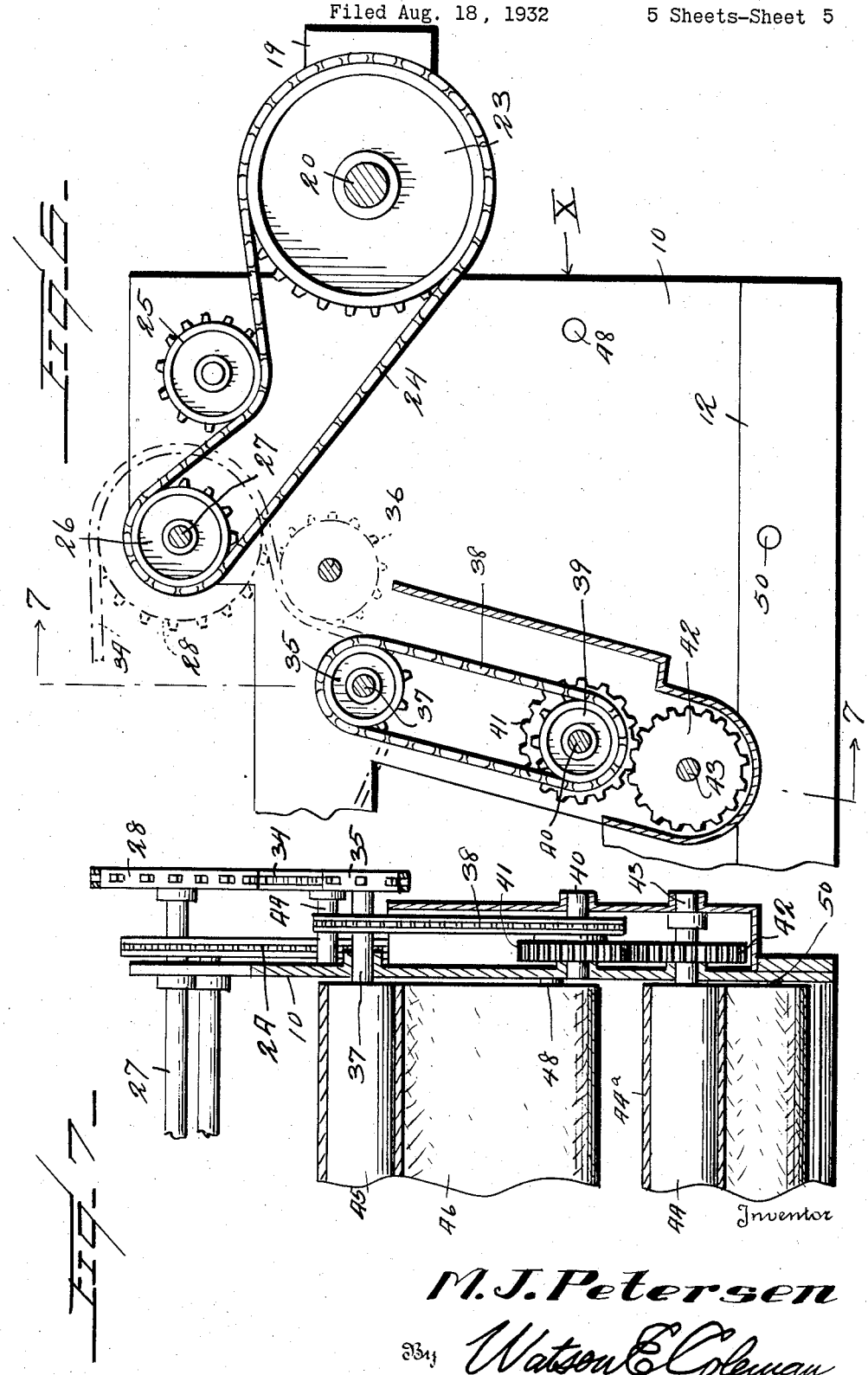

Patented July 25, 1933

1,919,705

UNITED STATES PATENT OFFICE

MARTIN J. PETERSEN, OF CANYON, MINNESOTA

WEED OR QUACK GRASS PLOW

Application filed August 18, 1932. Serial No. 629,354.

This invention relates to agricultural implements and particularly to a weed or quack grass exterminator.

The general object of the invention is to provide a machine in the nature of a plow which will cut and take up a slice of the surface ground or sod, this slice having a depth greater than the depth to which the roots of quack grass or other weeds run, overturning the slice so taken up and redepositing it upon the ground with the roots upward and the weeds face downward against the earth so as to thereby kill the grass and weeds.

A further object is to provide a machine of this character having a cutting blade which will cut a slice of earth and having a series of belts upon which the slice is delivered, the belts being so mounted that as the slice is carried rearward, it is completely overturned and deposited upon the ground in this overturned position.

A further object is to provide means for operating said belts, this means being driven by the traction wheels of the machine.

Other objects will appear in the course of the following description.

My invention is illustrated in the accompanying drawings, wherein:—

Figure 1 is a top plan view of a machine constructed in accordance with my invention but without belts which act to overturn the slice;

Figure 2 is a side elevation of the machine as shown in Figure 1;

Figure 3 is a longitudinal sectional view on the line 3—3 of Figure 1 and showing the overturned belts in place;

Figure 4 is a section on the line 4—4 of Figure 2 and showing the overturning belts in place;

Figure 5 is a section on the line 5—5 of Figure 2;

Figure 6 is a fragmentary elevation of the forward end of the machine;

Figure 7 is a section on the line 7—7 of Figure 6;

Figure 8 is a fragmentary top plan view showing a preferred manner of driving the rear conveyors.

Referring to the drawings and particularly to Figures 1 and 3 it will be seen that my mechanism embodies a frame formed of forward side members 10 and 10$^a$ spaced from each other, rear side members 11 and 11$^a$ also spaced from each other, and connecting bars or equivalent elements 12 riveted or otherwise attached to the side members 10, 10$^a$ and 11 and 11$^a$. Suitable braces 13 are disposed between the members 10, 10$^a$, 11 and 11$^a$ and hold them spaced apart. These spacing members may be of any suitable construction. The forward end of the machine is indicated generally by the letter X. Therefore, Figure 2 is an elevation looking at the right hand side of the machine. The portions 10, 10$^a$, 11 and 11$^a$ are connected to each other by the longitudinally extending bars 12 as previously described which are attached to the lower portions of the members 10, 10$^a$, 11 and 11$^a$, the members 10, 10$^a$, 11 and 11$^a$ extending upward from the bars 12 so that a space is left between the rear edge of each member 10 and 10$^a$ and the forward edge of each member 11 and 11$^a$.

Extending across this space are a plurality of spirally curved belt guides which are angular in cross section, as shown in Figure 2, and also, as shown in Figure 5. These belt guides are designated respectively 14, 15, 16 and 17. Each guide is spirally bent and the four guides, therefore, define a spiral. A cross section of these guides would show them arranged at the four corners of a rectangle. The guide 14 extends from the rear upper corner of the element 10$^a$ downward, rearward and laterally to the forward lower corner of the frame element 11. The guide 15 extends from the lower rear corner of the element 10$^a$ downward, laterally and rearwardly and upwardly to a point approximating the upper corner of the element 11. The guide 16 extends from the lower rear corner of the element 10 upward, rearward and laterally to the upper forward corner of the element 11$^a$ while the guide 17 extends from the upper rear corner of the element 10 upwardly, laterally and then downwardly and rearwardly to the lower corner of the element 11ª. These guides, as before stated, are angular in cross section and are connected at intervals by transversely extending braces 18 which may be attached to the guides in any suitable manner, either by welding, bolting or riveting. The extremities of the guides are attached either directly to the members 10 and 11 or 10ª and 11ª or attached to brackets extending from these members as will be more specifically stated. Certain conveyor belts operate over these guides and act to convey the slice rearward from the front end of the implement and, as before stated, rotate the slice and deposit it in an inverted position upon the ground behind the implement.

The forward end of the implement carries the forwardly projecting brackets 19 through which extends the axle 20, this axle carrying upon it the traction wheels 21 which are designated to ride upon the surface of the ground.

The forward end of the implement between the members 10 and 10ª is provided with the forwardly and downwardly extending cutting blade 22 which discharges upon an upwardly and rearwardly extending endless elevator 44ª as shown in Figure 3. This discharges the slice of sod on to the conveyor belts as will be later stated. Mounted upon the shaft or axle 20 are a pair of sprocket wheels 23 one of which is shown in Figure 2 and over each of these sprocket wheels a chain 24 passes. These chains pass beneath idler sprocket wheels 25 and then over sprocket wheels 26 mounted upon a shaft 27, this shaft carrying upon it at one end the sprocket wheel 28. Mounted at one end in a bracket 29 carried upon the forward end of the guide 17 is a shaft 30 whose other end is mounted in a bracket 31 attached to the rear upper corner of the frame element 10ª. This shaft 30 carries upon it the belt roller 55. It will be seen that this shaft extends diagonally with reference to the longitudinal line of the machine and extends across the space between the guide 17 and the guide 14. Mounted upon this shaft 30 is a sprocket wheel 33 and a sprocket chain 34 passes around this sprocket wheel and over the sprocket wheel 28 and beneath a sprocket wheel 35 and over an idler 36 as shown in Figure 2. The sprocket wheel 35 is mounted upon a shaft 37 and drives a sprocket chain 38 which, as shown in Figure 6, is trained over a sprocket wheel 39 carried by a shaft 40, this shaft carrying upon it the gear wheel 41 which meshes with a gear wheel 42 carried upon the shaft 43. This shaft 43 carries upon it the conveyor roll 44 over which the endless conveyor 44ª is trained as shown in Figure 3. Thus the traction wheels 21 drive the belt roller 44 and also drive the endless conveyor 44ª.

The sprocket wheel 35 is mounted upon a shaft 37 which carries a roller 45 over which an endless belt 46 passes, which belt approximately parallels the belt 44ª and at its forward end is carried by a roller 47 mounted upon a shaft 48. The forward end of the belt 44ª is mounted upon a roller 49 carried by a shaft 50. Thus the traction wheels drive the conveyor belts 44ª and 46 in the direction of the arrows in Figure 3 to carry the slice of sod upward and rearward into the machine after the slice has been cut by the knife 22. The knife 22 has a guard 51 attached to it which extends downward and beneath the roller 49 and the forward end of the belt 44ª so as to protect this belt from contact with the ground which would impede its rotation.

Inasmuch as there are four guideways, there are four belts operating in these guideways and four forward rollers for the belts and four rollers at the rear end of the machine over which these belts pass.

Disposed at the forward end of the spiral framework formed by the guides 14, 15, 16 and 17 are a plurality of driving rollers and specifically between the guides 16 and 17 is the roller 32 and supporting a belt. Disposed at the rear ends of these guides is a roller 52 which is mounted at its lower end in a bracket 53 and at its upper end in a bracket 54. Disposed between the forward end of the guide 14 and the forward end of the guide 17 is a roller 55 while disposed between the rear ends of the guides 14 and 17 is a roller 56. Disposed between the forward ends of the guides 14 and 15 is a roller 57 and disposed between the rear ends of these guides is a roller 58, this roller being mounted in a yoke 59 having a screw-threaded shank 60 extending through a pair of ears of a bracket 61, the shank carrying an adjusting nut 62 whereby the roller 58 may be drawn rearward or adjusted nearer to or further from the front end of the machine.

Disposed at the forward ends of the guides 15 and 16 is a roller 62 while disposed at the rear ends and between the guides 15 and 16 is the roller 63. I have already described the means for driving the shaft 30 upon which the roller 55 is mounted, that is, this roller is driven by the chain 34 driven by the shaft 27. For the purpose of driving the rollers 32 and 57, I mount upon the shaft 27 the beveled gear wheel 64 as shown in Figure 1 which engages a beveled pinion 65 mounted upon a longitudinal shaft supported in bearings 66, this shaft carrying upon it the beveled gear wheel 67. Coacting with this beveled gear wheel 67 is a beveled gear wheel 68 mounted upon a diagonally disposed shaft 69 which is mounted in bearings 70 and 71 carried by brackets attached to the main frame of the machine. This shaft 69 carries upon one end the beveled gear wheel 72 which engages with the beveled gear wheel 73 mounted upon a shaft 74 which carries the roller 32. Mounted upon the rear end of the shaft 69 is a beveled gear wheel 75 which meshes with a beveled gear wheel 76 carried by a shaft 77 which extends downward and forward and carries the roller 57. The roller 63 is mounted upon a shaft 78 which carries upon it a beveled pinion 79 engaged by a beveled gear wheel 80 mounted upon a forwardly and inwardly extending shaft 81 which is supported in bearing brackets 82 and 83 and carries at its forward end the beveled gear wheel 84 which engages with the beveled gear wheel 76. While the forward rollers 32, 55 and 57 are the driving rollers for their respective belts, the rear roller 63 is the driving roller for its belt.

Associated with the guides 15 and 16 and extending laterally from these guides is a supporting yoke 85 best shown in Figure 1 provided with the outwardly extending slots 86.

Disposed in suitable bearings mounted in these slots is a downwardly and rearwardly inclined shaft 88 carrying upon it a belt tightening roller 89. Nuts 90 hold this shaft in any adjusted position within the slots 86. Disposed between the guides 15 and 14 is a yoke 91 carrying upon it the roller 92. Inasmuch as the roller 58 is adjustable to tighten the belt, this roller 92 which coacts with the belt passing over the roller 58 is not adjustable. Associated with the guides 14 and 17 (in Figure 1) is a yoke 93 to which is attached the bearing 82 for the shaft 81, this yoke 93 being slotted at 94 in the same manner as the yoke 85 is slotted and mounted in these slots is a shaft 95 carrying a roller 96. The shaft is held in any adjusted position by the nuts 97. Coacting with the guides 16 and 17 and bridging the space between these guides is a yoke 98 formed in the same manner as the yoke 85 and slotted at 99 at both ends through which passes the shaft 100 having the nuts 101 and the belt tightening roller 102. A cross brace 103 extends across and is attached to the guides 16 and 17 and carries the bracket 83 which supports the shaft 81.

It will thus be seen that disposed between each pair of guides is a belt tightening roller for the belts which pass along these guides and that these rollers are adjustable to tighten the belts. Disposed between the rear ends of the guides 14 and 15 is a belt guiding roller or sleeve 104 seen best in Figure 2 and also shown in Figure 1. Extending parallel to this roller is a rod 105. Associated with the guides 15 and 14 and extending between these guides is a guide roller 106, a rod 107 extending parallel thereto.

It will be understood that the guides are supported by brackets of any suitable construction extending from the frame of the machine. Thus, as illustrated in Figure 2, the rear end of the guide 15 is supported by a bracket 108 which is attached to or formed as part of the element 11 and arches over the upper end of the roller 58 and the yoke 59 and also constitutes a support for the shaft 78. The forward end of the guide 14 is supported by means of a bracket 109 which is attached to the rear end of the member 10ª and also constitutes a support or bearing for the shaft of roller 57. The rear end of the guide 16 is carried by a bracket 110 extending from the member 11ª and supporting the shaft 78. This bracket also supports the belt guide 111 carrying the roller 112. It is obvious that the particular manner of connecting the ends of the guides 14, 15, 16 and 17 to the main element of the frame and the manner of supporting the various shafts is immaterial and may be varied in many ways. Hence it is not believed necessary to detail all of the supporting means between the extremities of the guides and the main elements of the frame nor all the bearings for the various shafts.

It is pointed out that in a longer machine, the pitch of the spiral guides would be much less than in a relatively shorter machine and the tilting of the belts operating within said guides would be less and that in the drawings the guides are shown as having a relatively steep curvature whereas in actual practice the pitch of the spiral would be much less.

The rear end of the machine may be constructed in the same manner as the forward end of the machine, that is, it is provided with the rear axle 113 upon which the rear traction wheels 114 are mounted.

Upper and lower belts 115 and 116 are provided corresponding to the belts 44ª and 46 as shown in Figure 3, the upper belt 115 being driven by a roller on the shaft 113, this shaft carrying a sprocket wheel 117 shown in dotted lines in Figure 3 from which a sprocket chain 118 is trained over a sprocket wheel 119 mounted on a shaft 120, this shaft carrying a gear wheel 121 also shown in dotted lines in Figure 3 which engages a gear wheel 122 mounted upon a shaft 123 which carries upon it the roller 124 which constitutes the driving roller for the belt 116, these belts passing over the idler rollers 125 and 126. The purpose of these belts 115 and 116 is to discharge the slice of sod on to the ground after it has been overturned by the carrying belts which will now be described. In order to avoid confusion, the belts have been given letters A, B, C, and D. The belt A extends over rollers 63 at one end and 62 at the other. The belt B extends over rollers 56 and 55, the belt C extends over rollers 52 and 32 and the belt D extends over rollers 58 and 57. The inner run of the belt A is twisted in its length and is guided by the guides 15 and 16. The belt B is likewise twisted in its length and is guided along the guides 14 and 17. The belt C is twisted in its length and is guided on the guides 16 and 17 while the belt D is guided by the guides 14 and 15. The four belts define between them a longitudinally extending, longitudinally twisted chamber, the walls of which are constantly moving from the front to the rear. The slice taken up by the shovel plow 22 is received upon the belt A. This belt as illustrated in Figure 4 is gradually shifted from a nearly horizontal position into a vertical position and is then overturned.

The belts on each side of the initially horizontal belt A are likewise turned in the spiral course so that while at one end a lateral belt is in a vertical position, it is gradually turned over until it is completely reversed and is again in a vertical position but on the other side of the machine. These four belts, therefore, hold the strip or slice of earth with the quack grass and weeds and as this slice is carried inward, it is turned from a horizontal position with the grass and weeds upward to a vertical position and then into an inverted horizontal position with the grass or weeds downward and is discharged upon the conveyor 116 which with the conveyor 115 carries the slice rearward and deposits it upon the ground with the weeds downward and the roots upward. The belt operating in the guides 14 and 15 may be tightened up by adjusting the roller 58. The other three belts are held tight by the belt tightener rollers 89, 102, and 96 which, of course, engage the outside runs of the belts.

This machine is designed to be drawn by draft animals or by a tractor and to cut sufficiently beneath the sod formed of weeds or quack grass as to take up a slice of earth with all the roots of the quack grass and weeds in it and completely overturn this slice so that while the quack grass roots will be upward they will be completely buried so deep as to smother the grass without exposing the roots. It will be understood that the forward edges of side plates 10 and 10ᵃ at their lower ends are sharpened to coact with the shovel blade 22 to cut a slice of sod and that the forward edges are contracted as shown in Figure 4 so that the slice will be narrower than the passageway between the plates 10 and 10ᵃ.

It is to be also understood that while the inside runs of the several conveyor belts will move in more or less straight lines between the rollers supporting them, yet that when the slice is deposited on the belts and is being carried up and overturned thereby, the slice will act to hold the belts outward against the guides. In this construction, all of the belts run at the same speed as the plow as this will cause the plow to work more smoothly and not plug up. The rollers over which the belts A, B, C and D move should be disposed diagonally to the frame as the belts will otherwise bind and slip to one side of the rollers if these rollers are at right angles to the frame. How much of an angle the rollers must be placed at will depend on how long or short the plow is.

While I have illustrated traction wheels 114 at the rear end of the plow, I do not wish to be limited to this as the traction wheels at the rear end may be omitted and the rear end of the plow simply allowed to drag over the ground. If these rear traction wheels are omitted, however, of course, the driving rollers for the belts 115 and 116 will be connected up so as to be driven from the shaft 78 in the manner shown in Figure 8. In this figure the belt conveyors 115 and 116 are driven from the forward driving mechanism and to this end the wheels 114 are omitted and mounted upon the shaft 113 is a beveled gear wheel 127 which carries upon its hub the sprocket wheel for the chain 117. The gear 127 is driven by a gear 128 of the same diameter as gear 127. Gear 128 is mounted upon a longitudinally extending shaft 129 carrying a beveled gear 130 meshing with a beveled gear 131 mounted upon shaft 78. Gears 131 and 130 are of the same diameter. Thus all the belts are run at the same speed. Under these circumstances, the rear side frames 11ᵃ will act as runners, though obviously the rear of the machine may be supported in any suitable manner. Further I do not wish to be limited to the use of sprocket chains for driving purposes as gears might be used.

It is to be particularly understood that with this machine a slice cut from the surface of the ground is of such thickness as to entirely contain the roots of the grass and that this slice is overturned so as to smother both the grass and the roots as, of course, the roots of quack grass must also be killed or they will start to grow again.

Obviously many changes might be made in the detailed construction of the machine without departing from the spirit of the invention as defined in the appended claims.

I claim:

1. An agricultural implement of the character described including a wheeled supporting frame, four longitudinally extending flexible conveyor belts, rollers on which the conveyor belts are supported, the inner runs of the belts being related to each other to define a transversely rectangular space, the belts extending spirally around a longitudinal axis common to all of the belts, each belt making a turn of approximately 180°, a shovel blade at the forward end of the machine, and means for discharging the sod slice cut by the shovel blade on to the forward ends of said belts with the grass of the slice upward.

2. An agricultural machine including a wheeled supporting frame, a plurality of longitudinally extending conveying belts, rollers over which the belts are supported, the inner runs of the belts being related to each other to define a transversely rectangular space, one of the belts extending horizontally from the forward end of the machine, another belt extending horizontally from the forward end of the machine but above the first named belt and two lateral belts extending vertically from the front of the machine, the belts from the front end of the machine extending spirally around a longitudinal axis common to all of the belts, a horizontal shovel blade at the forward end of the machine, and means for discharging a slice cut by said shovel blade on to the lowermost initially horizontal belt.

3. An agricultural machine including a wheeled supporting frame, a plurality of longitudinally extending conveying belts, rollers over which the belts are supported, the inner runs of the belts being related to each other to define a transversely rectangular space, one of the belts extending horizontally from the forward end of the machine, another belt extending horizontally from the forward end of the machine but above the first named belt and two lateral belts extending vertically from the front of the machine, the belts from the front end of the machine extending spirally around a longitudinal axis common to all of the belts, spirally arranged guides for said belts, means for taking up the slack in said belts, a horizontally disposed shovel at the forward end of the machine, means for discharging a slice cut by said shovel on to the forward end of the initially horizontal lower belt, and means for driving certain of the belt carrying rollers to thereby drive the belts in a direction to carry their inner flights rearward.

4. An agricultural machine including a wheeled supporting frame, a plurality of longitudinally extending conveying belts, rollers over which the belts are supported, the inner runs of the belts being related to each other to define a transversely rectangular space, one of the belts extending horizontally from the forward end of the machine, another belt extending horizontally from the forward end of the machine but above the first named belt and two lateral belts extending vertically from the front of the machine, the belts from the front end of the machine extending spirally around a longitudinal axis common to all of the belts, four spirally arranged guides for said belts mounted upon the frame of the machine, each guide engaging the marginal edges of two belts, the guides being angular in cross section.

5. An agricultural implement including a supporting frame, forward and rear traction wheels mounted upon said frame, the frame including four spirally arranged guides, angular in cross section and extending longitudinally of the machine, rollers mounted at the forward and rear ends of the guides, one roller between each pair of guides, four flexible conveyor belts mounted upon said rollers, the inner flights of said belts extending spirally around a longitudinal axis common to all of the belts, the belts being disposed at right angles to each other transversely of the machine and each guide engaging the marginal edges of two belts, the belts and guides being arranged in a spiral of 180°, there being a lower belt at the entrance end of the machine, two lateral belts and an upper belt, the upper and lower belts being disposed in horizontal planes, means actuated by the traction wheels for driving said belts, means for guiding the outer runs of the belts and taking up slack in the belts, a shovel disposed at the forward end of the machine below the level of the traction wheels, and means for conveying the slice out by said shovel rearward and depositing it upon the forward end of the lower horizontal belt, said belts acting to carry the slice rearward and simultaneously reverse it through approximately 180°.

6. An agricultural implement of the character described including a supporting frame, traction wheels therefor, the frame comprising opposed vertically extending parallel elements, two vertically disposed spaced rear elements, four conveyor belt guides connecting said elements, the guides being arranged in a spiral around a longitudinal axis common to all of the guides, each guide being angular in cross section, belt rollers mounted between the forward ends of all of the guides, rollers mounted between the rear ends of all of the guides, belts on the rollers, means mounted upon said frame and connected to certain of the traction wheels whereby said rollers may be operated to carry the inner runs of the belts rearward, means for supporting and guiding the outer runs of the belts, a shovel blade mounted between the vertical elements at the forward end of the machine and feeding conveyor belts rearward of said shovel and upon which the shovel discharges, said feeding conveyor belts discharging the slice upon the forward end of the lowermost of the four belts whereby said slice may be moved rearward and simultaneously turned through 180°.

7. An agricultural implement of the character described including a supporting frame, traction wheels therefor the frame comprising opposed vertically extending parallel elements, two vertically disposed spaced rear elements, four conveyor belt guides connecting said elements, the guides being arranged in a spiral around a longitudinal axis common to all of the guides, each guide being angular in cross section, belt rollers mounted between the forward ends of all of the guides, rollers mounted between the rear ends of all of the guides, four belts carried by said rollers, means mounted upon said frame and connected to certain of the traction wheels whereby said rollers may be operated to carry the inner runs of the belts rearward, means for supporting and guiding the outer runs of the belts, a shovel blade mounted between the vertical elements at the forward end of the machine and feeding conveyor belts rearward of said shovel and upon which the shovel discharges, said feeding conveyor belts discharging the slice upon the forward end of the lowermost of the four belts whereby said slice may be moved rearward and simultaneously turned through 180°, and means at the rear end of the machine and driven by the traction wheels whereby said slice may be received from said belts and discharged in its inverted position to the ground.

MARTIN J. PETERSEN.